Oct. 21, 1947.  D. L. HINGS  2,429,515
BIPOLAR SECONDARY BATTERY WITH ELECTROLYTE ABSORBENT
Filed Dec. 8, 1942
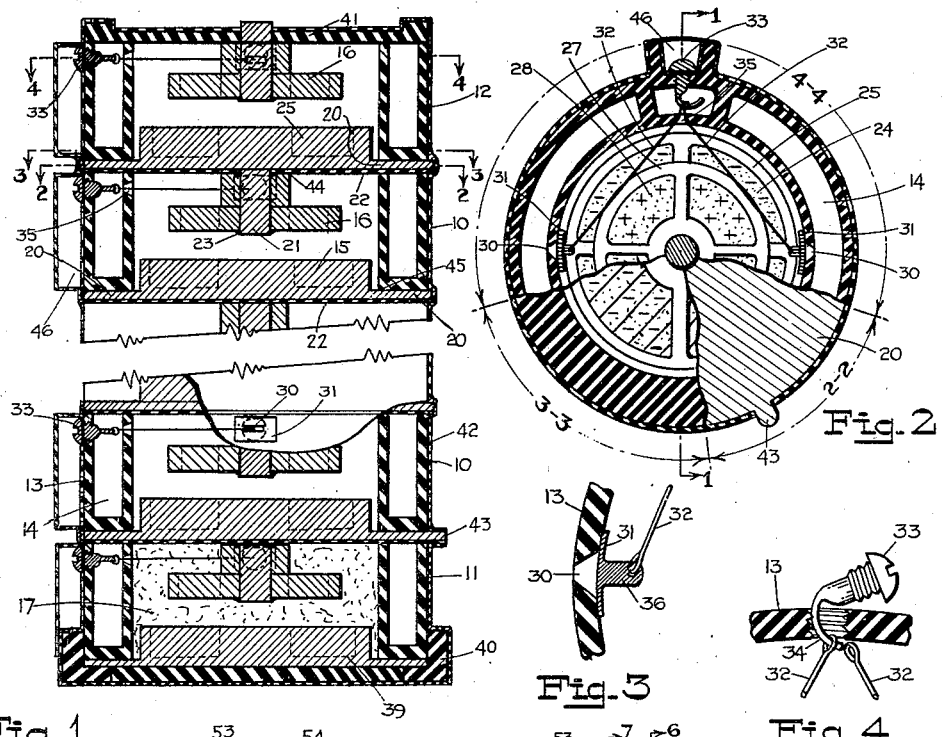
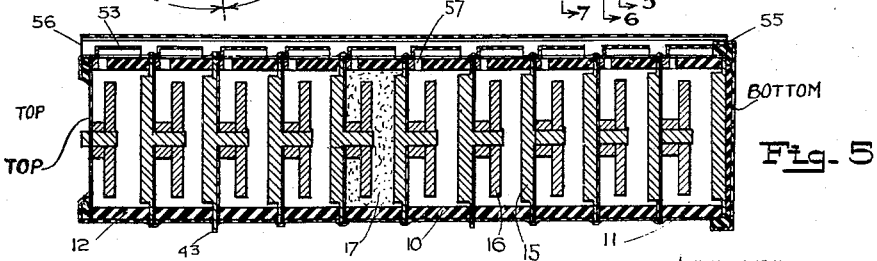
INVENTOR
DONALD L. HINGS
BY
Kreidling and Krost
attys Patented Oct. 21, 1947

2,429,515

UNITED STATES PATENT OFFICE 2,429,515

BIPOLAR SECONDARY BATTERY WITH ELECTROLYTE ABSORBENT

Donald L. Hings, Ottawa, Ontario, Canada, assignor to Electronic Laboratories, Inc., Indianapolis, Ind., a corporation of Indiana Application December 8, 1942, Serial No. 468,181
In Canada December 4, 1942

6 Claims. (Cl. 136—10)

My invention relates in general to batteries and more particularly to secondary batteries from which the electrolyte cannot spill or creep.

The invention will be described with relation to a high tension low capacity battery, but it is to be understood that features of the invention may be employed in the construction of a low tension, high capacity battery.

An object of my invention is the provision of a secondary battery which has a long shelf life.

Another object of my invention is the provision of a secondary battery from which the electrolyte cannot spill or creep.

Another object of my invention is the provision of a secondary battery which is provided with a dry absorbent filler and in which the electrolyte may be supplied to the dry absorbent filler just prior to the active use of the battery, to the end that the battery may remain in storage or upon a shelf without deterioration.

Another object of my invention is the provision of supplying the electrolyte to a plurality of individual cells without substantially short circuiting the cells.

Another object of my invention is the provision of facilitating the immediate absorption of the electrolyte into the dry absorbent filler by the use of a wetting agent, which obviates the use of a vacuum or pressure to force the electrolyte into the dry absorbent filler.

Another object of my invention is the provision wherein the absorbent filled after it is once supplied with the electrolyte functions to give good mechanical support to the internal structure of the battery parts.

Another object of my invention is the provision of giving an external visible indication when the electrolyte has been transferred from an electrolyte cavity in the battery to the dry absorbent filler.

Another object of my invention is the provision of a battery which carries the supply of electrolyte in the casing so that the electrolyte is always available for immediate use.

Another object of my invention is the provision of readily operable means which may be manipulated to allow the electrolyte, which is supplied in the casing, to flow into the cells where it will be absorbed by the dry absorbent filler.

Another object of my invention is the provision of a high tension low capacity battery, which may be constructed in layers, giving a layer-built battery wherein each layer is substantially of the same construction.

Another object of my invention is the provision of a secondary battery which will operate in any position.

Another object of my invention is to prevent internal battery leakage.

Another object of my invention is the provision of a secondary battery which has a parallel plate construction and which will operate in any position.

Other objects and a fuller understanding of my invention may be had by referring to the following description and claims taken in conjunction with the accompanying drawing, in which:

Figure 1 is a longitudinal cross section view of a battery embodying the features of my invention, taken along the line 1—1 of Figure 2 with the intermediate portion of the battery broken away;

Figure 2 is a cross sectional view taken in several planes of Figure 1, the sector 2—2 being taken along the line 2—2, the sector 3—3 being taken along the line 3—3, and the sector 4—4 being taken along the line 4—4;

Figure 3 is an enlarged fragmentary view showing a breakable seal for admitting the electrolyte from the cavity in the wall structure of my battery into the battery cell;

Figure 4 is an enlarged fragmentary view showing a hooked screw which is operated to break the breakable seal shown in Figure 3;

Figure 5 is a side cross sectional view showing another embodiment of my invention, the battery being illustrated in a horizontal position;

Figure 6 is a cross sectional view taken at different planes in Figure 5, the sector 5—5 being taken along the line 5—5, the sector 6—6 being taken along the line 6—6, and the sector 7—7 being taken along the line 7—7, and Figure 7 is an enlarged fragmentary view of a portion of the battery shown in Figure 5.

With reference to Figures 1 and 2, my battery comprises a plurality of intermediate cells 10, a bottom cell 11, and a top cell 12. Each cell is provided with an annular wall structure 13 made of a suitable insulating material and having an electrolyte cavity 14 which substantially extends completely around the cell. Within each cell is mounted at spaced distances apart a negative electrode 15 and a positive electrode 16. The space within each cell and around the electrodes is filled with a dry electrolyte absorbent 17. For the purpose of clarity the dry electrolyte absorbent 17 is not shown in all of the cells, nor in the cross section in Figure 2. The dry absorbent filler may be any suitable material which has the property of readily absorbing a large amount of the liquid electrolyte and may comprise, for example, peat which may be ground or otherwise broken up to form a substantially uniform texture. The prepared peat may be uniformly mixed with a small proportion of other suitably absorbent materials, as for example, red cedar sawdust. The peat and the other materials which might be mixed therewith is not my invention, as this material has been used before in batteries.

The negative electrode 15 comprises a lead disc 20 having a central post 21 extending downwardly from the underneath side of the disc and having a coating of spongy lead 24 formed from lead oxide applied to the upper side of the disc. As illustrated in Figure 2 the upper side of the disc 20 may be provided with ribs 25, which constitute a grid structure for the spongy lead 24. In Figure 2 the spongy lead has a plurality of negative marks shown thereon.

The positive electrode 16 comprises a relatively flat grid structure 27, having a central hub portion which surrounds the post 21 of the lead disc 20. The grid structure 27 may be filled with a paste of lead peroxide 28, in accordance with the usual construction of positive plates and in Figure 2 the peroxide has a plurality of positive marks shown thereon. The positive electrode 16 is electrically connected to the post 21 in order to provide a good electrical path from the lead disc 20 to the positive electrode 16. As illustrated in Figure 1 the positive electrode 16 may be soldered or otherwise suitably bonded at 23 to the post 21. The underneath side of the disc 20 is provided with an insulating covering 22, which extends out and around the peripheral edge of the disc 20. One purpose of the insulating covering 22 is to prevent internal battery leakage by providing a long distance over which current leakage attempts to occur. Thus, in my battery the leakage surface between the positive and the negative potentials of the cell extends from the point 44 to the point 45, and I find that this distance is sufficiently great that very little internal battery leakage occurs. The insulating covering 22 may be made by dipping the underneath side of the lead disc 20 in a suitable plastic or insulating material and may be of the same consistency as the material from which the wall structures 13 are made.

The liquid electrolyte is stored in the electrolytic cavities 14 of the wall structures 13, and is not introduced into the individual cells until the cell is about ready for use. Any suitable means may be employed to allow the electrolyte to flow from the cavity 14 into the cell to which it is associated. As illustrated in Figures 1 to 4, I employ two spaced breakable seals 31, which respectively cover apertures 30, the breakable seals 31 being each connected by means of a cord 32 to a hook 34 provided on a screw 33. Therefore, when breaking the seals 31, it is only necessary for the user to unscrew the screw 33 which causes the cords 32 to pull on the extensions 36 of the breakable seal 31 and fracture the seals, which allows the liquid electrolyte to flow into the cell with which it is associated. The cords 32 pass through an opening 35 in the inner wall structure just prior to engaging the hook 34. When the screw is completely unscrewed it may be removed from the opening by turning same as shown in Figure 4. This turning of the screw automatically releases the cords 32, after which the screw may be discarded with the cords remaining inside the cells. The breakable seals 31 may be made of any suitable fracturable material which may be bonded or otherwise suitably fastened to the internal surface of the wall structure of each cell. The cords 32 may be made of any suitable material and preferably of a material which does not chemically react with the electrolyte and for this purpose I find that a fibre glass cord works very well. The breakable seals 31 are also made of a material which does not chemically react with the electrolyte. My invention has a long shelf life, since the user does not break the seals 31 until he is ready to use the battery. In practice I employ a wetting agent which greatly facilitates the absorption action of the electrolyte being absorbed by the absorbent material. The wetting agent may be inserted in dry form in the dry electrolyte absorbent or it may be inserted in liquid form in the liquid electrolyte. In other words, the wetting agent makes it possible for the electrolyte to go into the dry absorbent filler without the use of vacuum or pressure to force it therein. As the liquid electrolyte is absorbed by the dry absorbent filler, the filler then swells or expands and thus provides a good strong inner support for the electrodes against breakage.

The wall structure 13 may be made of any suitable insulating or plastic material and is preferably made substantially transparent so that a visible indication is afforded the user since he can observe when the liquid electrolyte has been transferred to the battery cell. The electrolyte may be colored to increase the visual indication.

The intermediate cells 10 are all of the same construction and the bottom and top cells 11 and 12 are also of a like construction except that the bottom cell 11 is provided with a thicker disc 39 and except that the top cell 12 is provided with top insulated disc cover plate 41. In the assembling of my device the units are stacked in a vertical column after which they may be longitudinally clamped together by suitable clamping device. Then the entire assembly may be dipped in a suitable insulated material or plastic which provides an outside coating 42 for bonding all of the cell units together. The outside coating 42 may be made by one or more dips, depending upon the thickness required to give mechanical strength to the support of the cells. The bottom cell may be provided with an annular flange 40 in order to ensure that the bottom disc 39 is firmly secured to the wall structure. As illustrated in Figure 1 the lead discs 20 may each be provided with an external terminal lug 43 which enables current to be drawn from the battery at any selected voltage.

In breaking the seals 31 the battery is turned upside down until substantially all of the electrolyte is absorbed by the dry absorbent filler, after which the battery can then be mounted in any position, for the reason that the electrolyte is always kept in constant engagement with the positve and negative electrodes through the absorbent material, which firmly surrounds the electrodes. In Figure 1 the electrolyte is introduced into the cells without short circuiting the cells. The water which is subsequently added to the cells may be introduced through the screwed openings in the outer casing and through the openings 35 in the inner casing. A trough 46 may surround the screwed opening to facilitate the insertion of the water.

In Figures 5, 6 and 7 I show a modified form of my invention, in that the individual cells are supplied by the electrolyte and the water by an external arrangement comprising a plurality of cups 53 along the side of each cell. The cups 53 may be arranged in a vertical column and surrounded by an external duct 54, which extends from the bottom of the battery to the top of the battery. Each of the cups is connected to the cell with which it is associated by means of an opening 57. In the Figures 5, 6 and 7 the electrolyte is supplied from a separate container. In pouring the electrolyte in the cells, the battery is turned upside down with the end 56 of the duct 54 being temporarily closed, while the user pours in the electrolyte in the end 55 of the internal duct 54. The electrolyte is poured into the end 55 much faster than it can escape from the end 56, with the result that the entire column and the cups 53 become instantly filled, at which time the end 56 is suddenly opened which allows all of the electrolyte to suddenly escape from the duct, leaving the electrolyte in the filled cups 53 to be absorbed by the dry absorbent filler. This procedure is repeated several times until the required amount of electrolyte is supplied to each cell. A person can readily become skilled in introducing the electrolyte into the cells without short circuiting the cells, except for a very small fraction of time, because just as soon as the duct 54 is filled the end 56 is immediately opened to allow the rapid escape of the electrolyte. Instead of actually closing the end 56, the top of the battery may be set in a saucer or other vessel which substantially closes the end 56, and then after the electrolyte fills the duct the battery may be immediately raised from the saucer or other vessel to allow all of the electrolyte to immediately flow from the duct. This procedure may be repeated until sufficient electrolyte has been added to each cell. Water may also be introduced into each cell by the same procedure.

The cells of my battery are of substantial equal capacity. Substantially immediately upon the electrolyte being introduced into the cells a state of partial charge is effected with the result that the battery will give an immediate voltage and the capacity increases after a lapse of a short period. The absorbent material has a property of holding the electrolyte and prevents it from creeping out the openings to the outside surface of the casing of the battery. The breakable seals 31 are located internally of my battery so that there is no external exposure of the acid to the outside surface of the battery. The capacity of the troughs and of the chamber in which the screw occupied before being unscrewed serve as a measure for the amount of water to be supplied after several discharges to the cells which prevent too much water being added to each cell. The terminal lugs 43 may be used for testing the voltage of each cell and further in the event that one cell becomes weak the cell may be located and short circuited by connecting the proper terminals together externally of the casing.

Although I have shown and described my invention with a certain degree of particularity, it is understood that changes may be made therein without departing from the spirit of the invention which are included in the scope of claims hereinafter set forth.

I claim as my invention:

1. A secondary battery comprising a casing and a plurality of cells each having an electrolyte entrance opening therein, a plurality of cups externally of the casing for introducing an electrolyte through the said entrance openings into the cells, one cup for each cell, and a conduit surrounding the plurality of cups for directing the electrolyte into the cups, said conduit having opened ends to enable the electrolyte which is introduced into the conduit from one end to escape therefrom through the other end, said plurality of cups having side walls extending in the same general direction as the conduit and having bottom walls extending transversely thereto.

2. A secondary battery comprising a casing and a plurality of cells each having an electrolyte entrance opening therein, and means for introducing an electrolyte through the said entrance openings into the cells substantially simultaneously without electrically short circuiting the cells, said means comprising a plurality of cups, one cup for each cell, and a conduit surrounding the cups, said conduit having opened ends to enable electrolyte which is introduced into the conduit from one end to escape therefrom through the other end, said plurality of cups having side walls extending in the same general direction as the conduit and having bottom walls extending transversely thereto.

3. In a battery comprising at least a first and a second adjacent cell, each of said cells having a casing wall, said walls consisting of insulating material and having end surfaces disposed adjacent to each other, a negative electrode comprising a disc separating said adjacent cells and having a peripheral edge portion mounted between said adjacent surfaces of the casing walls and providing a liquid tight seal therewith, said disc having a first side exposed to the first cell and a second side exposed to the second cell, said disc having on said first side thereof a rib structure and active material therebetween, said rib structure being thicker than the peripheral edge portion and extending into said first cell, said disc also having an integral post disposed on the second side thereof and extending into the second cell, and a positive electrode electrically connected to said post in the second cell and spaced from the second side of the said negative electrode disc.

4. In a battery comprising at least a first and a second adjacent cell, each of said cells having a casing wall, said walls consisting of insulating material and having end surfaces disposed adjacent to each other, a negative electrode comprising a disc separating said adjacent cells and having a peripheral edge portion mounted between said adjacent surfaces of the casing walls and providing a liquid tight seal therewith, said disc having a first side exposed to the first cell and a second side exposed to the second cell, said disc having on said first side thereof a rib structure and active material therebetween, said rib structure being thicker than the peripheral edge portion and extending into said first cell, said disc also having an integral post disposed on the second side thereof and extending into the second cell, a positive electrode electrically connected to said post in the second cell and spaced from the second side of the said negative electrode disc, and insulating means covering said second side of the negative electrode disc to prevent internal battery leakage.

5. In a battery comprising at least a first and a second adjacent cell, each of said cells having a casing wall, said walls consisting of insulating material and having end surfaces disposed adjacent to each other, a negative electrode comprising a disc separating said adjacent cells and having a peripheral edge portion mounted between said adjacent surfaces of the casing walls and providing a liquid tight seal therewith, said disc having a first side exposed to the first cell and a second side exposed to the second-cell, said disc having on said first side thereof a rib structure and active material therebetween, said rib structure being thicker than the peripheral edge portion and extending into said first cell, said disc also having connection means disposed on the second side thereof and extending into the second cell, a positive electrode electrically connected to said connection means in the second cell and spaced from the second side of the said negative electrode disc, and an absorbent filler and an electrolyte for the said cells, said absorbent filler mechanically supporting the positive electrode.

6. In a battery comprising at least a first and a second adjacent cell, each of said cells having a casing wall, said walls consisting of insulating material and having end surfaces disposed adjacent to each other, a negative electrode comprising a disc separating said adjacent cells and having a peripheral edge portion mounted between said adjacent surfaces of the casing walls and providing a liquid tight seal therewith, said disc having a first side exposed to the first cell and a second side exposed to the second cell, said disc having on said first side thereof a rib structure and active material therebetween, said rib structure being thicker than the peripheral edge portion and extending into said first cell, said disc also having an integral post disposed on the second side thereof and extending into the second cell, a positive electrode electrically connected to said port in the second cell and spaced from the second side of the said negative electrode disc, electrolyte supply means carried by the casing wall externally of the cells, and breakable seal means for blocking communication between the supply means and the cells.

DONALD L. HINGS.

REFERENCES CITED

The following references are of record in the file of this patent:

UNITED STATES PATENTS

| Number | Name | Date |
|---|---|---|
| 681,660 | Spahr | Aug. 27, 1901 |
| 1,341,469 | Kershaw | May 25, 1920 |
| 1,506,278 | Sturges | Aug. 26, 1924 |
| 1,509,209 | Huntley | Sept. 23, 1924 |
| 552,220 | Williams | Dec. 31, 1895 |
| 1,381,298 | Gill | June 14, 1921 |
| 1,417,692 | Rosen | May 30, 1922 |
| 1,848,035 | Van Meter | Mar. 1, 1932 |
| 2,181,891 | Hazell | Dec. 5, 1939 |
| 296,331 | Gumpel | Apr. 8, 1884 |
| 1,021,900 | Smith | Apr. 2, 1912 |
| 1,653,872 | Pepper | Dec. 27, 1927 |
| 594,917 | Storm | Dec. 7, 1897 |
| 1,469,015 | Jones | Sept. 25, 1923 |
| 1,566,927 | Rosen | Dec. 22, 1925 |

FOREIGN PATENTS

| Number | Country | Date |
|---|---|---|
| 350,285 | Great Britain | June 11, 1931 |
| 384,515 | Great Britain | Dec. 8, 1932 |
| 17,987 | Great Britain | 1906 |